ated November 17, 1917. Serial No. 202,492.
UNITED STATES PATENT OFFICE.

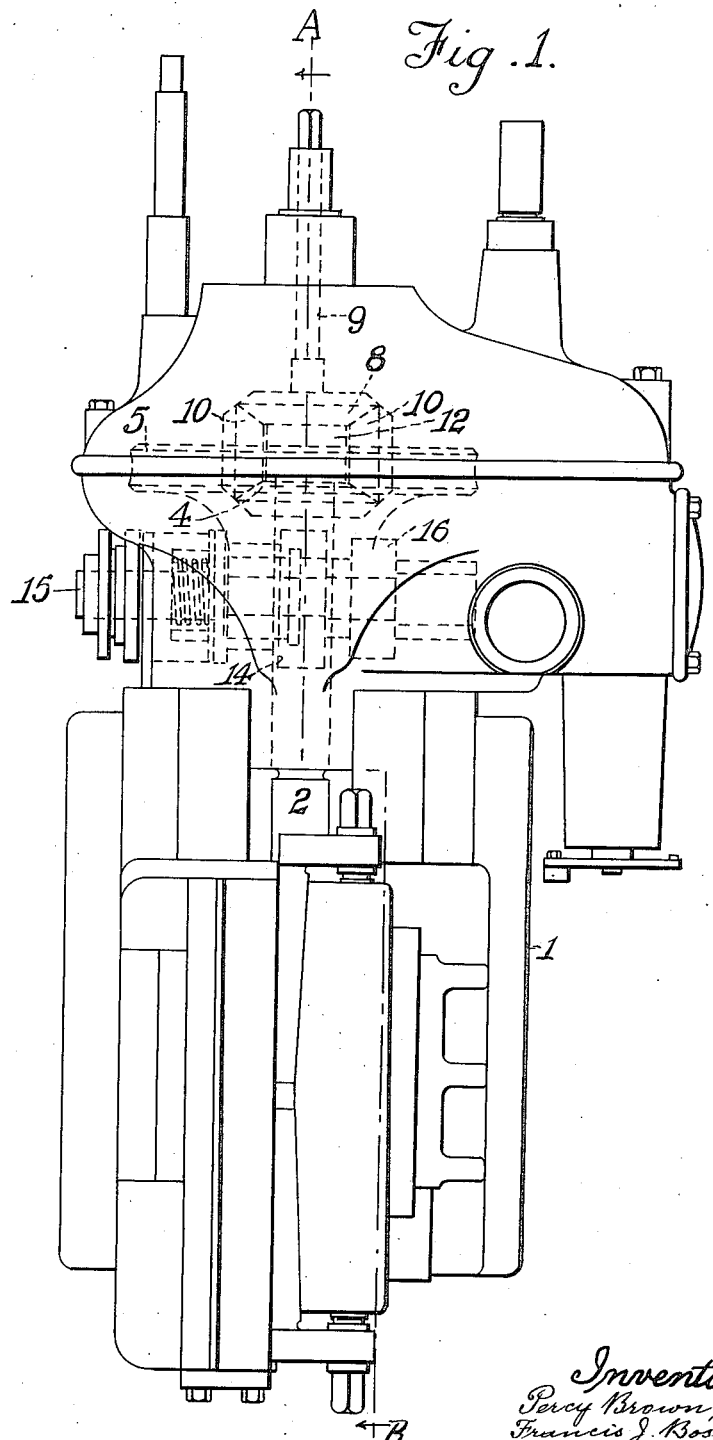

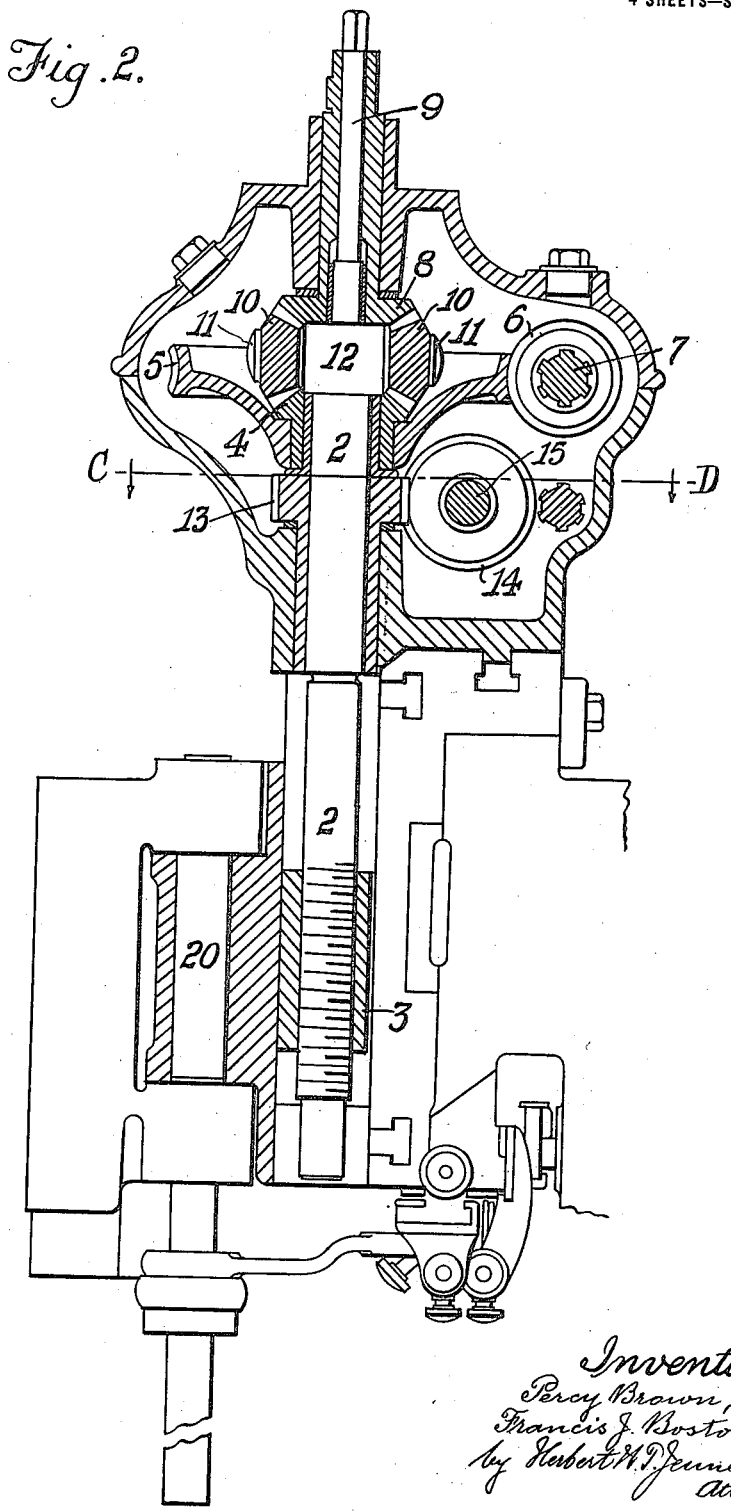

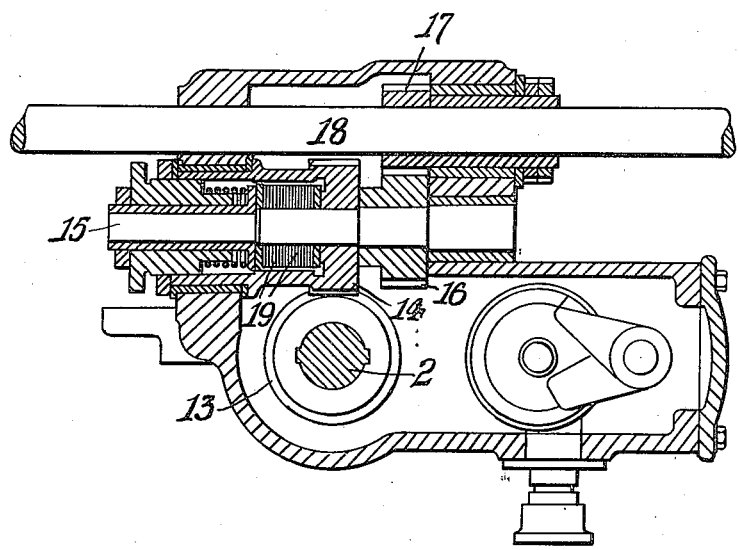

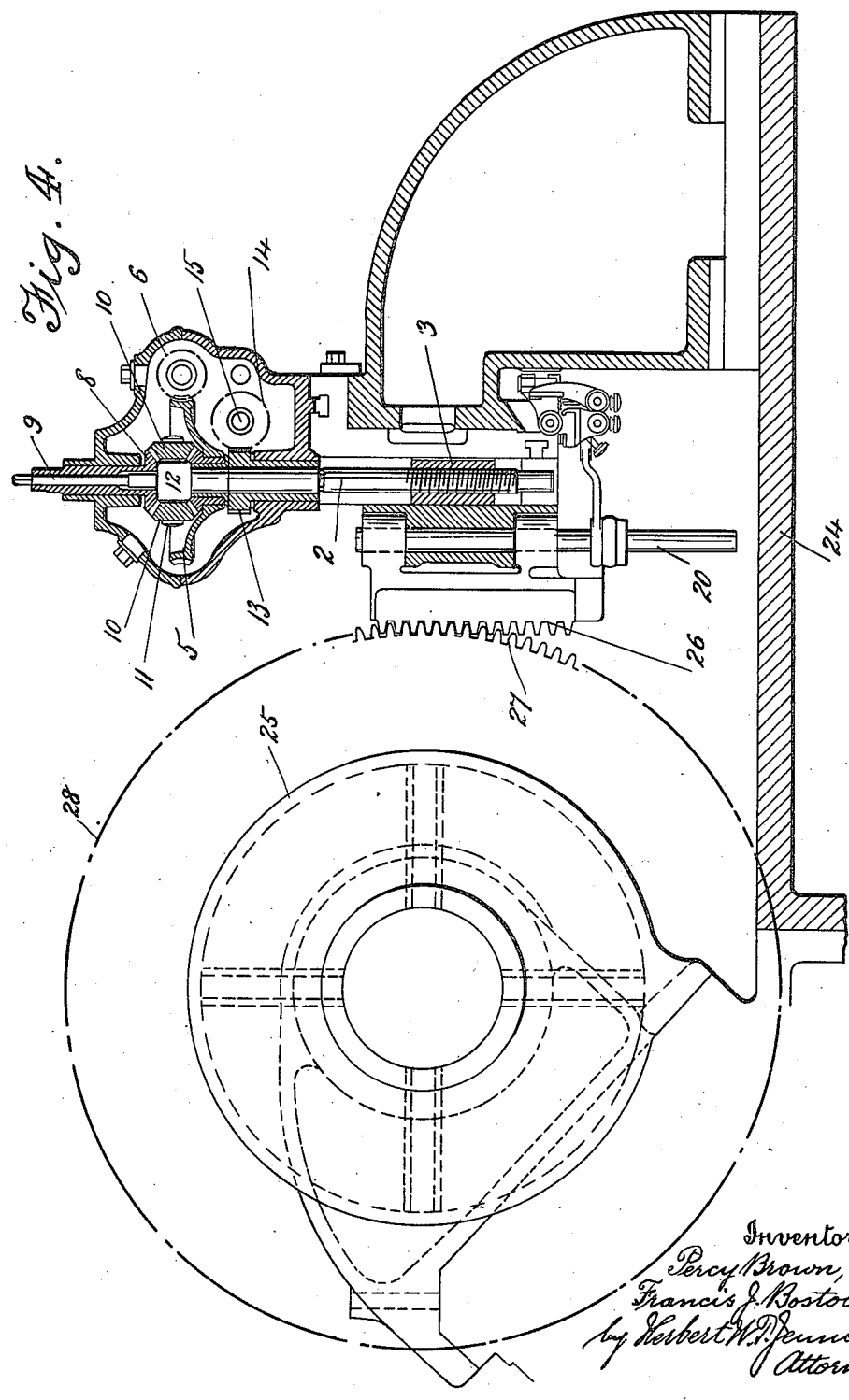

PERCY BROWN AND FRANCIS J. BOSTOCK, OF HUDDERSFIELD, ENGLAND.

GEAR-CUTTING MACHINE.

1,322,872.  Specification of Letters Patent.  Patented Nov. 25, 1919.

Application filed November 17, 1917. Serial No. 202,492.

*To all whom it may concern:*

Be it known that we, PERCY BROWN and FRANCIS JOHN BOSTOCK, subjects of King George V of Great Britain, residing at Huddersfield, in the county of York, England, have invented a new and useful Improvement in Gear-Cutting Machines, of which the following is a specification.

This invention relates to certain improvements in machines of the rack cutter type for cutting spur, spiral, single or double helical, or like gears and has for its object the provision of improved mechanism for operating the cutter slide and cutter to secure greater accuracy in the cutting of gear wheels and reduce the time required for the cutting operation.

Hitherto, such gears have been cut on machines capable of so acting as to permit of the indexing, that is to say, of the removal of the cutter from one tooth to another tooth, being carried out during a temporary cessation of rotation of the blank, and to allow of this, either the cutter and the blank have been relatively withdrawn from each other, or the reciprocating motion of the cutter has been arrested at the end of one of its strokes across the face of the blank.

Furthermore, the usual method of overcoming the effect of the backlash due to the reversal of the motion for the indexing is to allow the cutter to fall a relatively greater amount than is actually required for indexing, then, some time after the reversal has taken place and when the cutter is in a potion in unison with the blank, the cutting motion is again resumed.

The invention comprises means for performing the indexing operation while the blank is continuously rotating and without the cutter being arrested at the end of its stroke or the withdrawal of the blank and the cutter relatively from each other for the purposes of the indexing operation. The improved mechanism embodying the invention also eliminates backlash and therefore avoids the necessity for taking up the excess motion prior to the resumption of the cutting operation.

Other objects and features of the invention will more fully appear from the following description and accompanying drawings and will be particularly pointed out in the annexed claims:—

Figure 1 is an elevation of the cutter slide with its gear box, detached;

Fig. 2 is a transverse vertical section taken on line A. B of Fig. 1, and

Fig. 3 is a sectional plan taken on the line C. D of Fig. 2.

Fig. 4 is a sectional view of the driving mechanism, similar to that shown in Fig. 2, but is drawn to a smaller scale, and shows the mechanism applied to the co-acting parts of an operative gear cutting machine.

Referring to the drawings, the invention consists of a special form of differential motion in conjunction with the individual cutter slide 1 for imparting to a spindle 2 screw threaded at its lower end and working through a nut 3 on the cutter slide, a slow operative movement in one direction and a quick return movement.

The bevel wheel 4 of the differential is mounted loosely on the spindle 2 and on the boss of said bevel wheel is secured a worm wheel 5 meshing with a worm 6 fast on a shaft 7 receiving a constant rotary motion from the main drive of the machine (not shown) in any ordinary manner, a constant rotary motion thus being imparted to the said bevel wheel 4. The opposing bevel wheel 8, or second member of the differential is fast on a separate shaft 9 geared up to the usual change or holding wheels of a dividing motion (not shown) which said wheels are alternately locked or held stationary and then released so as to be free to rotate as determined by the locking or release of the dividing wheel in well known manner.

The planet pinions 10 constituting the third member of the differential are carried on pins 11 projecting from a cross head 12 secured to the spindle 2. To the spindle 2 is also secured a helical toothed wheel 13 meshing with a second helical toothed wheel 14 mounted on a shaft 15 which is driven through the gear 16 (Fig. 3) fast on said shaft 15 and a gear 17 fast on a shaft 18 which is driven by suitable gears from the main drive of the machine. The helical toothed wheel 14 is loose on the shaft 15 but is adapted to drive same, when no opposing pressure is placed thereon, through the medium of a slipping or positive clutch comprising in this instance a series of metal plates or disks 19 keyed alternately to the shaft 15 and to the gear 14, which are held in frictional engagement with each other and are forced into frictional contact with the gear 14 my the action of a spring in well known manner to transmit rotary motion from the shaft 15 to the helical gear 14. The driving mechanism is supported upon a base 24, as shown in Fig. 4, and a chuck 25 is also supported from the said base. The rack cutter 26 is operated by the driving mechanism so as to cut teeth 27 in a blank 28 which is held in the chuck and is indicated by a circle of dots and dashes.

In the operation of the machine, when the change or holding wheels geared up to the shaft 9 are held stationary by the locking of the dividing wheel for the cutting stroke the bevel wheel 8 is likewise held stationary and a slow motion in one direction is imparted through the differential to the spindle 2 by the worm 6 and worm wheel 5, the gear 14 being allowed to rotate with the gear 13 and spindle 2 by reason of the action of the slip drive or clutch.

The cutter slide and holder are actuated to reciprocate the cutters across the face of the blank by ordinary means and at the end of the cutting stroke the cutter holder, pivoting about the spindle 20 is withdrawn by known means from its work and at the end of the return stroke is moved by similar means back into position for the next cutting stroke, such motions being common to gear cutting machines and in themselves forming no part of the invention. While the above motions are taking place continuously, the cutter slide is being caused to travel upwardly by the threaded portion of the spindle 2 working through the nut 3, and after it has been moved a predetermined amount, a trip device is actuated by the pivoted cutter holder so as to release the change or holding gears and thus remove the resistance from the gear 14.

On the change thus being called for by the unlocking action of the dividing wheel, the change or holding wheels are released so as to freely rotate and the bevel wheel 8 is thus free to rotate whereby the spindle 2 is thereupon driven at a high speed in the opposite direction by the motion imparted through the shaft 15 to the gear 13 plus the motion imparted through the worm and worm wheel to the differential.

The indexing operation is as before described, performed during the return or non-cutting portion of the cutter and the action is so timed that when the cutter is ready for again cutting the blank, the indexing operation will have been completely carried out and the cutter again positioned in unison with the blank which is continuously revolved. By this means backlash is avoided and greater accuracy secured in the cutting of gear wheels. The time required for the cutting operation is also reduced.

Having thus described our invention, what we claim as new and desire to secure by Letters Patent is:—

1. In a gear cutting machine, a cutter slide, a driving shaft for operating the cutter slide in each direction, a differential mechanism operatively connected with the said driving shaft, means for revolving the driving shaft slowly in one direction through the said differential mechanism while one member of it is held stationary, driving means for revolving the said driving shaft rapidly but in the reverse direction, an automatic clutch device which renders the last said driving means inoperative while the said driving shaft is being revolved slowly, and means for holding the said one member of the differential mechanism stationary at predetermined intervals to permit the driving shaft to be revolved slowly.

2. In a gear cutting machine, a cutter slide provided with a nut, a screwthreaded driving shaft engaging with the said nut, a change spindle arranged axially in line with the driving shaft, a differential mechanism having two of its members operatively connected with the said shaft and spindle, toothed wheels for revolving the said shaft slowly in one direction, said wheels being connected to the member of the differential mechanism which is mounted on the said shaft, driving wheels operating to revolve the said driving shaft rapidly but in reverse direction, an automatic clutch device which renders the last said driving wheels inoperative while the driving shaft is being revolved slowly, and means for holding the change spindle of the differential mechanism stationary at predetermined intervals to permit the driving shaft to be revolved slowly.

3. In a gear cutting machine, a cutter slide, a driving shaft for operating the cutter slide in each direction, a change spindle arranged axially in line with the driving shaft, a differential mechanism having two of its members operatively connected with the said shaft and spindle, a wheel for revolving the said shaft slowly in one direction, said wheel being secured to the member of the differential mechanism which is mounted on the said shaft, a toothed driving wheel secured to the said driving shaft, a countershaft, a toothed wheel mounted loosely on the countershaft and gearing into the aforesaid toothed driving wheel, an automatic clutch device which disconnects the toothed wheels from the countershaft while the driving shaft is being revolved slowly, and means for holding the change spindle of the differential mechanism stationary at predetermined intervals to permit the driving shaft to be revolved slowly.

4. In a gear cutting machine, a cutter slide, a driving shaft for operating the cutter slide in each direction, a change spindle arranged axially in line with the driving shaft, a differential mechanism having two of its members operatively connected with the said shaft and spindle, a worm wheel secured to the one member of the differential mechanism which is mounted on the said driving shaft, a worm gearing into the said worm wheel and operating to revolve the driving shaft slowly in one direction, driving means for revolving the said driving shaft rapidly but in the reverse direction, an automatic clutch device which renders the last said driving means inoperative while the said driving shaft is being revolved slowly, and means for holding the said one member of the differential mechanism stationary at predetermined interals to permit the driving shaft to be revolved slowly.

In testimony whereof we affix our signatures in the presence of two witnesses.

PERCY BROWN.
FRANCIS J. BOSTOCK.

Witnesses:
THOMAS H. BARRON,
MARY BARRON.